(12) United States Patent
Mindich

(10) Patent No.: US 7,419,558 B2
(45) Date of Patent: Sep. 2, 2008

(54) METHOD FOR MAKING PRESTRESSED TUBULAR BELT

(75) Inventor: Alex Mindich, Glenview, IL (US)

(73) Assignee: ATBC, LLC, Glenview, IL (US)

(*) Notice: Subject to any disclaimer, the term of this patent is extended or adjusted under 35 U.S.C. 154(b) by 0 days.

(21) Appl. No.: 11/744,941

(22) Filed: May 7, 2007

(65) Prior Publication Data

US 2007/0199803 A1    Aug. 30, 2007

Related U.S. Application Data

(62) Division of application No. 11/386,908, filed on Mar. 21, 2006, now Pat. No. 7,261,203, which is a division of application No. 10/782,655, filed on Feb. 19, 2004, now Pat. No. 7,051,868.

(51) Int. Cl.
  *B29D 17/00* (2006.01)
  *F16G 1/00* (2006.01)

(52) U.S. Cl. .................. 156/137; 264/229

(58) Field of Classification Search .............. 198/819, 198/844.1, 844.2, 847, 957; 156/137; 264/229
See application file for complete search history.

(56) References Cited

U.S. PATENT DOCUMENTS

| | | |
|---|---|---|
| 789,135 A | 5/1905 | Baggaley |
| 1,427,553 A | 8/1922 | Schwinger |
| 2,013,242 A | 9/1935 | Johns |
| 2,109,861 A | 3/1938 | Johns |
| 2,212,024 A | 8/1940 | Johns |
| 2,244,845 A | 6/1941 | Matthews |
| 2,548,111 A | 4/1951 | Johns et al. |
| 2,852,126 A | 9/1958 | Ohlberg |
| 3,429,422 A | 2/1969 | Yoshimura |

(Continued)

FOREIGN PATENT DOCUMENTS

DE    1 934 342    7/1970

(Continued)

OTHER PUBLICATIONS

Japan Pipe Conveyor Co., Ltd.; Transportation System Pipe Conveyor; English, 1982.

(Continued)

*Primary Examiner*—Douglas A Hess
(74) *Attorney, Agent, or Firm*—Schiff Hardin LLP

(57) ABSTRACT

A method for manufacturing a self-closing tubular belt with predetermined compression forces at a longitudinal joint comprises winding a plastic material onto a small mandrel such that the plastic material thickness is not more than the height of a mandrel spiral rib, curing the plastic material, and removing the plastic material from the small mandrel, resulting in the plastic material being in a form of a spiral rubber spring having gaps between its twists. The resultant rubber spring is then wound on a larger mandrel thereby forming winding gaps. These winding gaps are then filled with a raw filler material, and these are processed so that all turns of the rubber spring are joined together monolithically. This is removed from the mandrel by making a longitudinal split in the spring, producing the tubular belt having prestressed regions formed by the spring, and resisting portions formed by the filler material.

2 Claims, 16 Drawing Sheets

U.S. PATENT DOCUMENTS

| | | |
|---|---|---|
| 3,469,676 A | 9/1969 | Wheeler |
| 3,595,378 A | 7/1971 | Kamisaka |
| 3,615,152 A | 10/1971 | Bouzat et al. |
| 3,661,244 A | 5/1972 | Koyama |
| 3,762,536 A | 10/1973 | Rogers |
| 3,773,167 A | 11/1973 | McGinnis |
| 4,053,547 A * | 10/1977 | Redmond, Jr. ............... 264/102 |
| 4,061,223 A | 12/1977 | McGinnis |
| 4,106,613 A | 8/1978 | Thomson |
| 4,387,801 A | 6/1983 | Hoover |
| 4,402,395 A | 9/1983 | Hashimoto |
| 4,410,082 A | 10/1983 | McGinnis |
| 4,572,359 A | 2/1986 | Fujita et al. |
| 4,819,791 A | 4/1989 | Melander |
| 4,823,941 A | 4/1989 | Mindich |
| 4,856,769 A | 8/1989 | Andrew et al. |
| 5,107,983 A | 4/1992 | Tschantz |
| 5,351,810 A | 10/1994 | Tingskog |
| 5,400,899 A | 3/1995 | Tingskog |
| 5,511,652 A | 4/1996 | McGinnis |
| 5,836,440 A | 11/1998 | Mindich |
| 5,891,286 A | 4/1999 | Weder |
| 6,029,801 A | 2/2000 | Odin et al. |
| 6,032,789 A | 3/2000 | Mayer et al. |
| 6,137,983 A | 10/2000 | Okabayashi et al. |
| 6,540,069 B2 | 4/2003 | Tschantz |
| 6,712,199 B1 | 3/2004 | Bruckner et al. |
| 7,032,744 B1 | 4/2006 | Pietsch |

FOREIGN PATENT DOCUMENTS

| | | |
|---|---|---|
| FR | 796 295 | 4/1936 |
| FR | 2 263 955 A1 | 10/1975 |
| JP | 52-25383 | 2/1977 |
| JP | 56-48312 | 5/1981 |

OTHER PUBLICATIONS

Japan Pipe Conveyor Co., Ltd.; Transportation System Pipe Conveyor; Japanese, 1982.

* cited by examiner

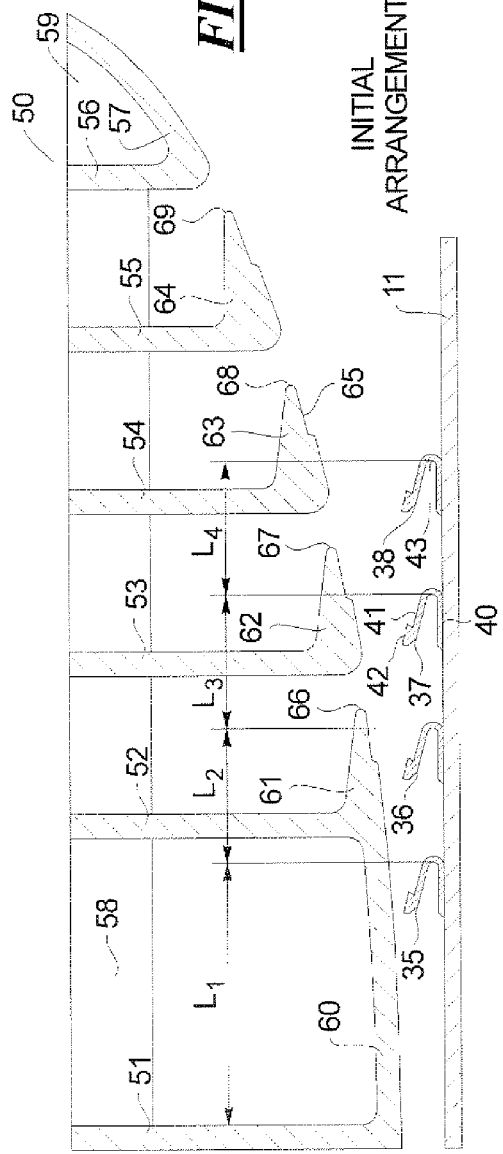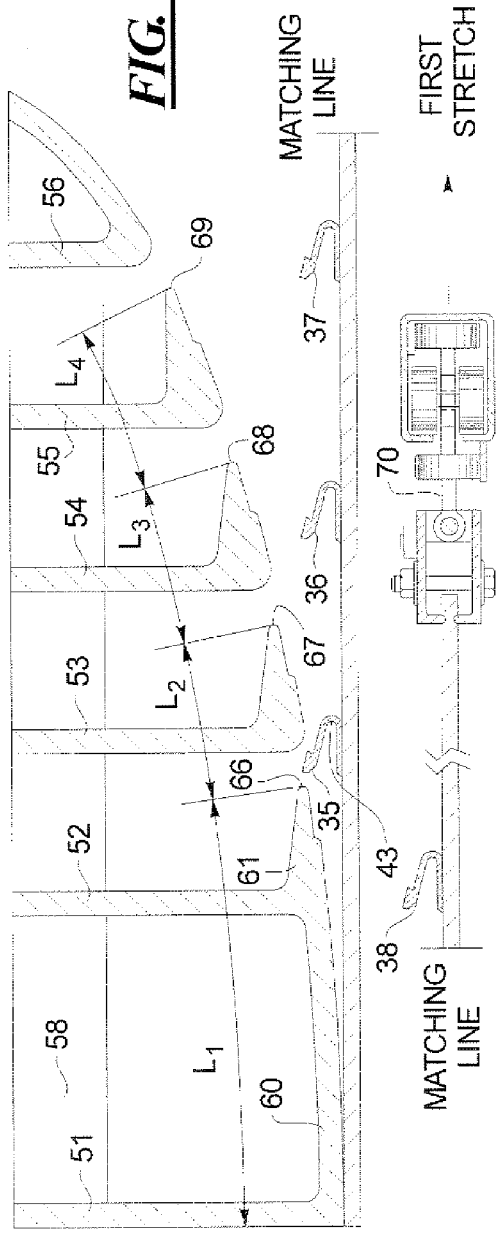

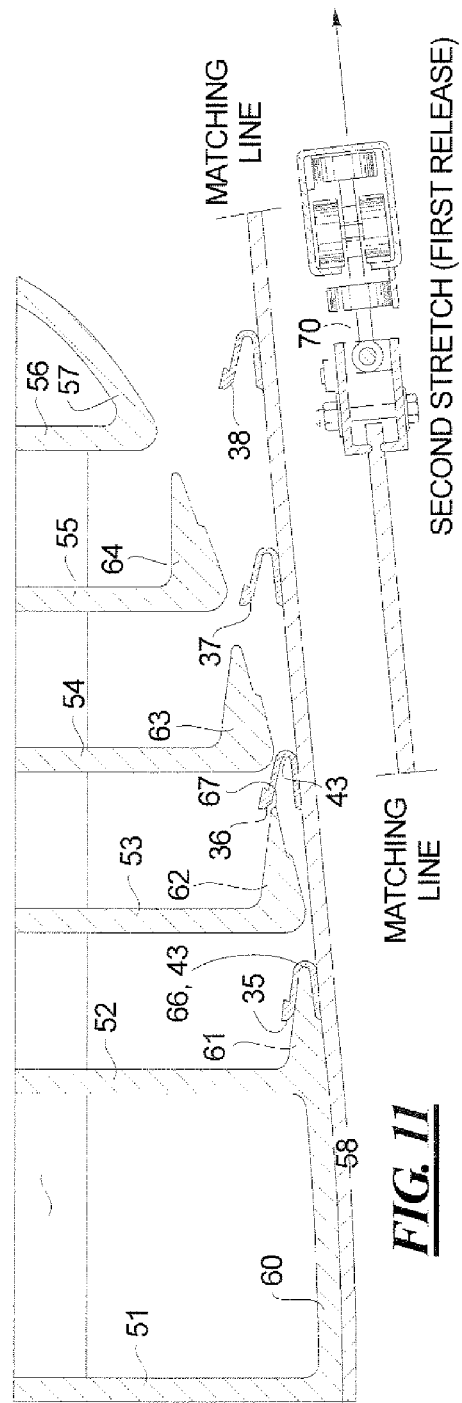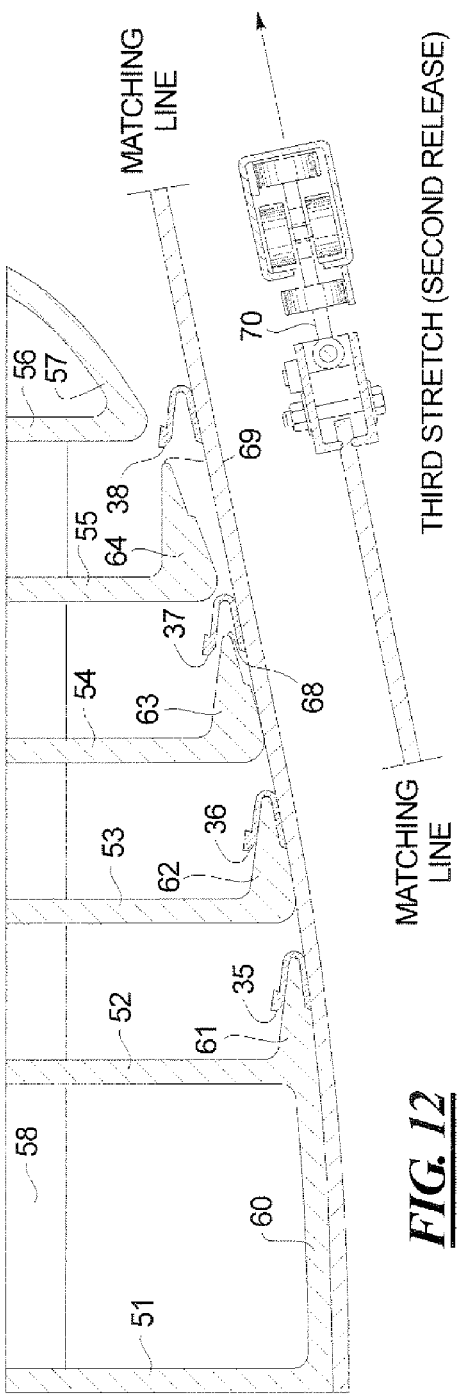

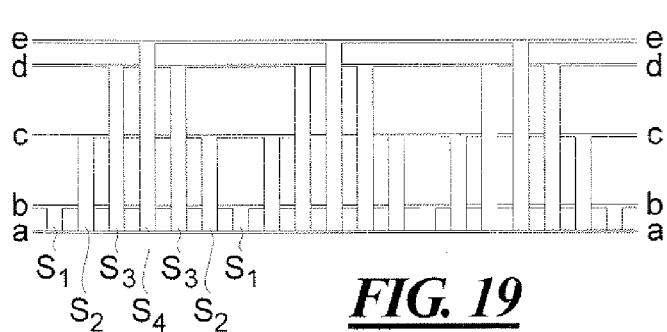
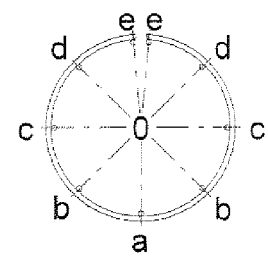
FIG. 19
FIG. 20
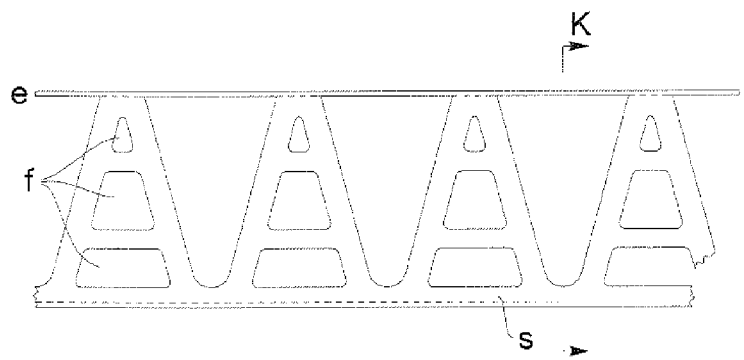
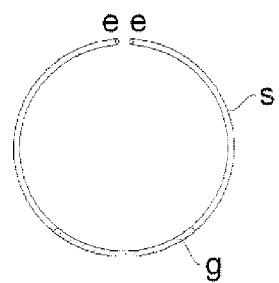
FIG. 21
FIG. 22
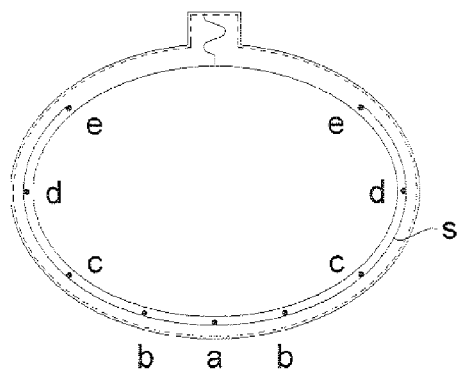
FIG. 23

METHOD FOR MAKING PRESTRESSED TUBULAR BELT

CROSS REFERENCE TO RELATED APPLICATIONS

This Application is a divisional application of parent application Ser. No. 11/386,908, filed Mar. 21, 2006, now U.S. Pat. No. 7,261,203, which is a divisional of parent application Ser. No. 10/782,655, filed Feb. 19, 2004, now U.S. Pat. No. 7,051,868. The parent applications are herein incorporated by reference.

BACKGROUND OF THE INVENTION

The present invention relates to tubular belt conveyors and, in particular, to a prestressed, self-closing tubular conveyor belt and to the components and to the overall construction of the production line which is used for making such prestressed tubular belt.

In my previous inventions, U.S. Pat. Nos. 4,823,941 and 5,836,440, it was suggested that the lateral prestressing of the multi-layer tubular belt of two or more layers can be secured when the layers are prestressed laterally and then joined together by gluing, welding, or by reinforcing the belt with a prestressed flexible spring-like carcass, or by a combination of these two approaches. Longitudinal edges are fabricated, respectively, as a tongue on one side and as a mating grove on another side. In one aspect, this belt comprises elastic inner and outer layers which are permanently joined together so that the inner layer is in tension across its width before and after fabrication, and the outer layer was not prestressed before fabrication but is in compression across its width after fabrication.

In this configuration, the inner prestressed forces wind the flat belt into a tubular configuration after the multi-layer belt is cured. The inner bending moment is large enough to bend the belt laterally through 360° so that the edges are always under compression, no matter what the configuration of the conveyor path is, what the speed of movement is, or what the loading condition of the conveyor belt is.

This known method of fabrication, as described above, requires preparing two flat layers of elastic material of different width. The inner layer (smaller width) is prestressed in the lateral direction by tensile forces distributed along longitudinal edges of the layer; it is stretched to the larger width of the outer layer. Next, the two layers are tied together by applying pressure perpendicular to the plane of the layers, and simultaneously gluing or welding them to form the composite two-layered tubular belt. Then the tensile forces along longitudinal edges of the inner layer and the pressure perpendicular to the layers' plane are removed, allowing the released belt to shrink to its normal tubular configuration.

The technology of fabricating the prestressed tubular belt addressed the fundamental principle of forming a tubular shape using the above-described stressing mechanism. However, when creating the shape of the tube, a problem results when trying to balance the shape of the tube with providing a compression force across the belt longitudinal joint. For example, for having a circular cross section after prestressing and for a compression force across the belt longitudinal joint, one might have either a circular shape with nearly no compression forces along the belt joint, or, by increasing the constant lateral stress for achieving the predetermined compression in the joint, one might achieve a distorted shape of the cross section, usually resulting in the edges curling inside toward the center of the tube.

SUMMARY OF THE INVENTION

In view of the above discussion, it is one objective of the present invention to provide any desired cross-sectional shape of the prestressed tubular belt with predetermined compression forces at the longitudinal joint of the belt. Another objective of the present invention is to provide a production line construction which guarantees the final shape and compression force at the longitudinal joint of the belt. The above and other objectives of the present invention are achieved in a conveyor belt that is prestressed along its transverse width to provide a flexible, openable, normally closed tubular configuration.

Various embodiments of the invention are envisioned. An embodiment relates to a self-closing prestressed tubular belt with a longitudinal joint, comprising: a first layer having tension forces that are variable along its width; and a second layer that is attached to the first layer having compression forces that are variable along its width, so that the belt will curl around an axis defined by a length of the belt with a predetermined shape and a predetermined force at the longitudinal joint.

Another embodiment relates to a self-closing prestressed tubular belt with a longitudinal joint, comprising: a first layer that is prestressed; and a second layer having a depressed central portion that is filled with the first prestressed layer.

Another embodiment relates to a self-closing prestressed tubular belt with a longitudinal joint, comprising: a first layer that is prestressed; and a second layer having a central region, wherein the first layer is joined to the second layer only in the central region so that the central region of the two joined layers is thicker than a peripheral region.

Another embodiment relates to a self-closing prestressed tubular belt with a longitudinal joint, comprising: a split zone on a lower portion of the belt wherein the belt is divided into one or more flaps along a dividing plane parallel to a surface of the belt.

Another embodiment relates to a self-closing prestressed tubular belt with a longitudinal joint, wherein a bending stiffness of the belt in a plane lying through an interlock of the joint and a centroid of a section of the belt is equivalent to a similarly constructed tubular belt having no longitudinal joint.

Another embodiment relates to a self-closing prestressed tubular belt with a longitudinal joint, the belt being configured to be operable when bent along its longitudinal axis having a curvature radius of less than three hundred times a diameter of the belt.

Another embodiment relates to a method for manufacturing a self-closing tubular belt with predetermined compression forces at a longitudinal joint, comprising: producing a first stressed layer having tension forces that are variable along its width; producing a second unstressed layer having no forces along its width; and joining the first layer to the second layer.

Another embodiment relates to a method for manufacturing a self-closing tubular belt with predetermined compression forces at a longitudinal joint, comprising: providing a first nonstressed layer having a depressed central region; stretching the depressed central region of the first layer by applying a force to the ends of this region; and placing a second nonstressed layer into the depressed central region and fastening the second nonstressed layer to the first layer.

Another embodiment relates to a method for manufacturing a self-closing tubular belt with predetermined compression forces at a longitudinal joint, comprising: providing a first layer having one or more attached anchor strips; contacting the first layer with a bottom surface of a tool comprising one or more rib protrusions configured to mate with the one or more attached anchor strips; applying a force along a width of the belt to bring the one or more anchor strips in a position to engage in a tension relationship the respective one or more rib protrusions, thereby holding a portion of the belt in tension; and fusing a second layer that is nonstressed to the first layer after applying the force to the first layer.

Another embodiment relates to a system for manufacturing a prestressed tubular belt with a longitudinal joint, comprising: a first elastic layer of a tubular belt comprising one or more attached anchor strips; a tool comprising one or more rib protrusions configured to mate with the one or more attached anchor strips when the first elastic layer is in contact with the tool.

Another embodiment relates to a system for manufacturing a prestressed tubular belt with a longitudinal joint, comprising: a first elastic layer of a tubular belt; an array of flat spring elements generally forming a herring-bone structure and configured to provide a variable bending inner moment across the width of the belt, the spring elements being connectable to the first elastic layer; and distribution rods connected to the spring elements at their end points and midpoints.

Another embodiment relates to a method for manufacturing a self-closing tubular belt with predetermined compression forces at a longitudinal joint, comprising: providing a cylindrical small mandrel having a spiral rib, spirals of the spiral rib having spacers; winding a plastic material onto the small mandrel having a spiral rib, such that the plastic material thickness is not more than the height of the spiral rib; curing the plastic material; removing the plastic material from the small mandrel, resulting in the plastic material being in a form of a spiral rubber spring having gaps between its twists; winding the rubber spring on a larger mandrel such that widest sections of the spring are associated with one end of the mandrel diameter, and narrowest sections of the spring are associated with an opposite end of the mandrel diameter, thereby forming winding gaps; filling the winding gaps with a raw filler material; processing the rubber spring and the raw material so that all turns of the rubber spring are joined together monolithically; and removing the processed rubber spring with filler from the mandrel by making a longitudinal split spring along a line through the narrowest sections of the spring, thereby producing the tubular belt in the spring, thereby producing the tubular belt having prestressed regions formed by the spring, and resisting portions formed by the filler material Additional objectives and features of my invention are evident from the following description taken in conjunction with the accompanying drawings.

BRIEF DESCRIPTION OF THE DRAWINGS

FIG. 9 is a cross-section view showing initial arrangement of the inner layer with attached anchor strips and the multi-step prestressing device;

FIG. 10 is a cross-section view showing the inner layer that is stretched out with the help of a guided grip. The first attached anchor strip is in the proper position to be engaged with the multi-step prestressing device.

FIG. 11 is a cross-section view showing the second stretch (first release) of the inner layer with help of a guided grip. The first attached anchor strip is in its final position and the second attached anchor strip is in a position to be engaged with the multi-step prestressing device;

FIG. 12 is a cross-section view showing the third stretch (second release) of the inner layer with help of a guided grip. The first and second attached anchor strips are in their final positions and the third attached anchor strip is in a position to be engaged with the multi-step prestressing device;

FIGS. 19-22 schematically depict side elevation views and transverse cross-sections of reinforcement bands for the tubular belt;

FIG. 23 is a transverse cross-section view of an embodiment of the tubular belt, which can incorporate the reinforcements of FIGS. 19-22;

DETAILED DESCRIPTION OF THE PREFERRED EMBODIMENTS

Overview

Figure 1:
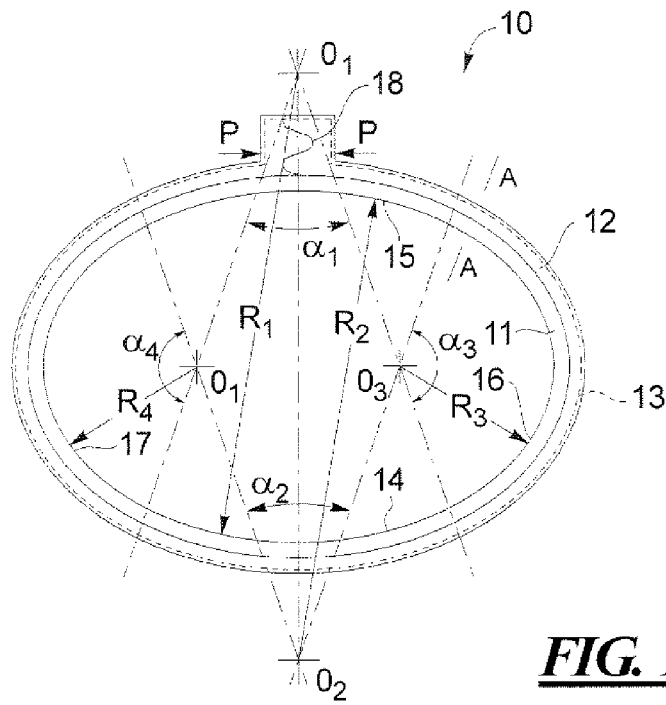
FIG. 1. is a schematic view of the cross-section of the preferred embodiment of the prestressed tubular belt.

Various embodiments of the invention discussed above are described in more detail below. According to one embodiment of my invention, the belt is comprised of elastic inner and outer layers that are joined together so that the inner layer is in variable tension along its whole width and the outer layer is in variable compression along its width, with the result that internal bending moments maintain the belt in a desirable cross sectional shape and secure a normally closed tubular configuration.

In an embodiment of my invention, the desired combination of compression and tension is provided using elastic inner and outer layers, having an unstressed width that are, respectively, less than and greater than the nominal belt width, and an inner layer has variable prestressing along the whole width of the belt. In another embodiment, only a central portion of the inner layer has a variable prestressing and the peripheral portion of the inner layer width does not have any prestressing. Another embodiment considers a premolded tubular belt (the outer layer) with a depressed central portion, which is filled with a prestressed inner layer to achieve the same goal of maintaining both the design cross sectional shape of the tubular belt and the design compression force between closed edges of the tubular belt. Yet another embodiment of my invention is the solid premolded design shape of the tubular belt with an inner prestressed layer, which is attached to the central portion of the mold, thus increasing the total thickness of the belt in this portion.

The invention is broad enough to encompass any belt in which its cross section is closed and prestressed in a circumferential direction, and where longitudinal edges are in contact against each other and the fulfillment of a desirable interlock leads to an increase of the thickness of the belt in this area.

The bending stiffness (a product of the modulus of elasticity and moment of inertia) of this suggested tubular belt in the plane which lies through the interlock and centroid of the section is equal to a solid section, despite a "crack" in the interlock. These features bring a qualitative difference between known conveyor belts and the belts described herein. In a normal belt conveyor, the belt is a flexible membrane stretched between end pulleys and supported by idler rollers; its working condition (sag between rollers) is secured only with stretching forces and physically is described with catenary equations. The suggested tubular belt, due to its bending stiffness factor, behaves as a continuous beam on multiple supports; it does not need stretching in a longitudinal direction for functioning.

Only a tubular belt constructed by this invention may be routed to make, for example, a continuous 360° turn having a radius as little as only ten times its diameter, and be operational in such a configuration. This construction permits turns having radii as small as 200, 100, 50, 30, 20 or even 10 times the diameter of the belt, which is significantly smaller than turns having a radii that are 300 times the diameter for belts according to the prior art. For example, using the designs incorporated herein, it has been demonstrated that a belt 6" in diameter are operable in a curve having a radius of 6'.

Inventively, a self-closing prestressed tubular belt may be provided with a longitudinal joint wherein a bending stiffness of the belt in a plane lying through an interlock of the joint and a centroid of a section of the belt is equivalent to a similarly constructed tubular belt having no longitudinal joint.

This can be illustrated by the following, based on exemplary configurations. Known values used below have been obtained from "Belt Conveyor for Bulk Materials", Conveyer Equipment Manufacturers Association (CEMA), Fifth Addition (BCBM reference).

Assume the following:

| material: | rice (rough) |
|---|---|
| average weight: | 36 lbs/cu ft (Table 3-3, BCBM reference) |
| angle of repose: | 30° (Table 3-3, BCBM reference) |
| belt width: | 30 in |
| belt weight – Wb: | 6.5 lb/ft |
| | Belt is 20° troughed with 20° surcharge angle |
| cross section of load: | 0.522 sq. ft. (Table 4-2, BCBM reference) |
| weight of material – Wm: | 0.522 * 36 = 18.79 lb/ft |
| total weight Wb + Wm: | 6.5 + 18.79 = 26.29 lb/ft |

The BCBM reference, Chapter 6, p. 114, provides the basic equation for the sag in a catenary:

$$\text{Sag, ft} = (W_b + W_m) * S_i^2 / 8T$$

where T—tension in belt, lbs.; and
$S_i$—idler spacing, ft.

The BCBM reference (p. 115) suggests sag as 3% of the span of the belt to prevent spillage from the conveyor belts operating over 20° troughing idlers and suggests (Table 5-2, p. 64) a normal spacing of $S_i$=5.0 ft.

The tension in the belt to satisfy the example data is
$T=(W_b+W_m)*S_i/(8*0.03)=526.9$ lbs.

One can realize that if such a belt conveyor would be arranged to make a 45° turn, the horizontal force for holding the belt in place should be 402 lbs. and equal to 2*526.9=1053.8 lbs. in case such an imaginary turn would be arranged for 180° turn.

A tubular belt based on an embodiment of the invention (for purposes of equal productivity, as an example) would have inner diameter $D_i$=10";
outer diameter $D_o$=11.5";
$W_b$=10.5 lb/ft;
$W_m$=15.7 lb/ft;
moment of inertia of circular tubular belt I=367.7 in$^4$; and
assumed modulus of elasticity E=250 psi;

The formula for sag in the middle of the multispan beam is $$\text{Sag} = (W_b + W_m) * Si^4 / 384 EI$$

Assuming the same allowance for the sag as 3% (i.e., 0.03 $S_i$) span, the allowable span is:

$$S_i = (0.03 * 384 \, EI/(W_b + W_m))^{1/3}$$

Putting in the data of this example, $S_i$=79", which is 30% more than for open belt and does not require any tension in the belt.

Thus, one can arrange any form of conveyor path, in any direction. It should be noted that 3% sag was used in this example for "equal comparison" purposes. The tubular belt of my invention will not spill any material due to its closed prestressed shape, therefore, the sag restriction of an open belt conveyor does not apply and can be allowed as 6% instead of 3%. The span between idlers in this case would be Si=99", which is 65% more than for an open belt and does not require any tension in the belt.

Referring now to the figures, FIG. 1 is a cross section view of a tubular belt according to an embodiment of the present invention. According to this embodiment, the tubular belt 10 has a length, width and thickness having two layers: an inner layer 11 which is prestressed in direction of its width before bonding to the outer layer and subjected to tension stresses all the time, and outer layer 12, which is in neutral state before bonding to the inner layer and subjected primarily to compression stresses along its thickness. Outer layer 12 may have a cord material 13 incorporated within.

FIG. 1 depicts four zones of the cross section of the tubular belt:
- zone 14 with bending radius $R_1$ from center $0_1$ within central angle $\alpha_1$,
- zone 15 with bending radius $R_2$ from center $0_2$ within central angle $\alpha_2$,
- zone 16 with bending radius $R_3$ from center $0_3$ within central angle $\alpha_3$,
- zone 17 with bending radius $R_4$ from center $0_4$ within central angle $\alpha_4$.

Parameters of zones are determined from design requirements. They may be equal or not equal to each other. It is desirable however to have one zone on both sides of the longitudinal edges connection 18.

Figure 2:
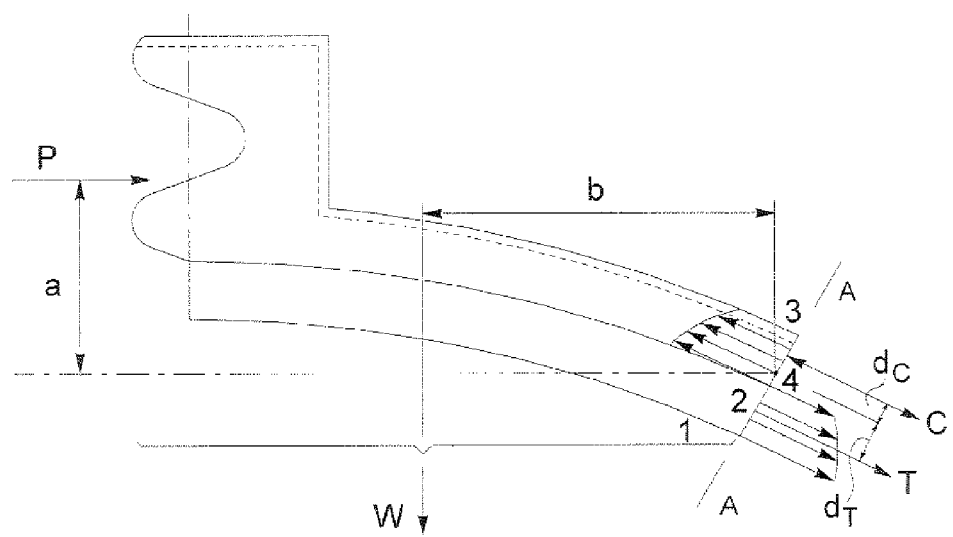
FIG. 2 is a cross-section view depicting the schematic force arrangement of outer and inner forces acting on the random cut off edge portion of the tubular belt.

FIG. 2 depicts all forces (inner and outer) acting on the cut off portion of the tubular belt including the longitudinal edge. The cut off section A-A is randomly located as shown on FIG. 1. The outer forces are P & W. The force P is a compression force (a reaction) between closed longitudinal edges of the tubular belt. Force P is determined at the design stage depending on the conveyor route, material properties of the transported product, dimensions of the tubular belt, etc. Force W is the resultant of all gravity forces (including material weight, where appropriate).

There are four nodes along the total thickness of the belt at the section A-A. Distance 1-2 is a thickness $t_i$ of the inner layer 11 and distributed tension stresses $\sigma_t$ have a resultant tension force T located at the centroid of tension stresses. Span 2-3 is a thickness of the outer layer 12 and distributed compression stresses $\sigma_c$ have a resultant compression force C located at the centroid of compression stresses. Node 4 is located at the neutral flexural axis of the combined section 1-2-3. Resultants T & C are located at distances $d_t$ & $d_c$ from the neutral axis respectively. Force P has an arm "a" relative to the node 4 and the force W has an arm "b" relative to the node 4. The total bending moment $M_{tot}$, which is applied to the section A-A produces the curvature of the belt and a radius of the elastic curve is determined as:

$$R = EI/M_{tot} \quad (1)$$

where
E—modulus of elasticity of belt material; and
I—moment of inertia of the combined section.

The total bending moment $M_{tot}$ is the sum of bending moment due to external forces $M_e$ and bending moment due to internal forces $M_i$ $$M_e = W*b - P*a \quad (2)$$

$$M_i = T*d_t + C*d_c = T*(d_t + d_c) = \sigma_t * t_i * (d_t + d_c) \quad (3)$$

Finally, the general expression for initial prestressing and radius of curvature in any given section is $$\sigma_t = (EI/R - W*b + P*a)/(t_i*(d_t + d_c)) \quad (4)$$

Equation (4) illustrates a simple fact that the bigger the arm of the desirable thrust between longitudinal edges of the tubular belt and the section in consideration is, the more prestressing force is required in this section. Additionally, the "steeper" the curvature required (the smaller the radius R is) in the section of consideration, the larger the prestressing force shall be. In other words, in order to design any final tubular belt shape with the help of prestressed inner layer(s) of the belt, that prestressing shall be variable along the cross-sectional perimeter of the belt, with reduced prestressing toward the longitudinal edges of the belt.

It should be noted that the cord material layer 13 serves not only to withstand longitudinal driving forces acting along conveyors, and to diminish longitudinal elongation of the belt, but also plays an important role as a reinforcing element and should be considered either in tension or in compression stress distribution in its vicinity and always taken into account in securing either minimal stretch or contraction deformation of the outer layer or of the whole section of the tubular belt for various technological purposes. Cord material layer 13 may be located at any place of the belt cross section, in part or as a whole, where it can serve as a resisting element that interacts with the active prestressing element (inner layer(s)) and affects the final shape of the tube and final thrust/force between longitudinal edges.

In practice, it is very difficult to maintain "smooth" change of variable prestressing along the width of the belt while manufacturing. Therefore, the width of the belt is broken into equal or unequal portions with different but constant prestressing at each portion. This produces an easily achievable stepwise way of prestressing with steps of maximum prestressing in the middle portion of the belt and steps of lower prestressing (or no prestressing) close to longitudinal edges of the belt. The value of prestressing at the last step along the longitudinal edges of the belt may be rounded to zero, with a shaping of the joined layer into a design configuration during the gluing/welding/fusion process.

Tubular Belt 10 and Methods of Construction

The tubular belt 10, alternative embodiments of the belt, and methods of constructing the various embodiments are depicted in FIG. 1 and FIGS. 3 through 14. As previously mentioned, a primary advantage of the belt 10 and its alternatives is the inherent ability to maintain a tubular configuration. This configuration results from both stresses that are incorporated into the belt during its fabrication and a compression force of thrust between longitudinal edges of the tubular belt. A multi-layer belt construction of two or more layers, in which the inner layer is prestressed, then joined together with outer layer by fusion or adhesion, develops the prestressed forces.

FIGS. 3A-D depict the principal method of making the tubular belt in three steps.

Figure 3A:
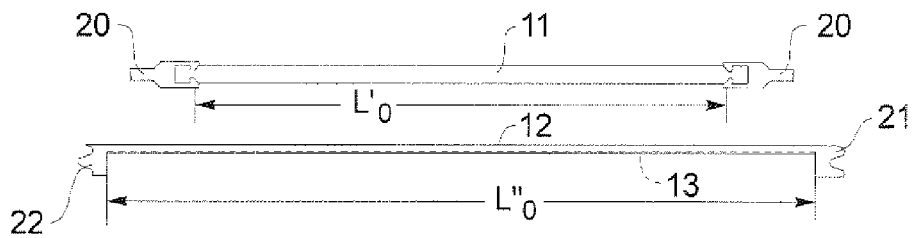
FIGS. 3A-D are cross-section views showing an initial position and the three stages of production of the prestressed tubular belt with variable prestressing along the width of the belt.

FIG. 3A shows the initial configuration of inner layer 11 having a width $L'_0$ between anchors 20 on both longitudinal edges. Outer layer 12 (with a cord layer 13) has an initial reference width $L''_0$ between longitudinal edges 21 and 22. Longitudinal edges 21 and 22 have special shapes that match one another.

Figure 3B:
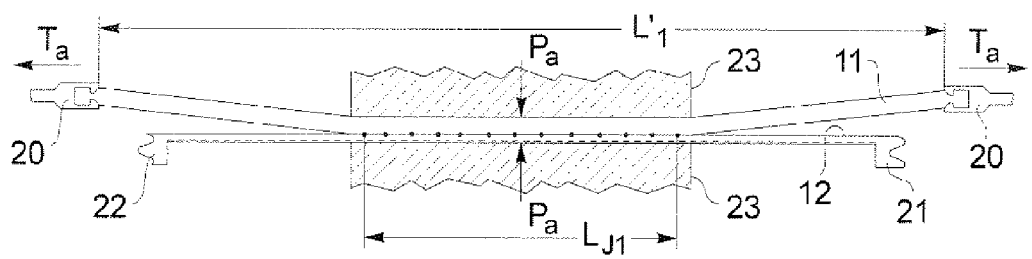

FIG. 3B depicts the first step of production of the tubular belt. The inner layer 11 is stretched to the width $L'_1$ between anchors 20 due to force $T_a$, which is applied to anchors 20. The reference width $L''_0$ of the outer layer 12 remains constant. The central portion of the layers 11 and 12—the joint width $L_{J1}$—is covered with glue or primer/activator or both and press-forms 23 are applied producing fusion of layers 11 and 12 with the help of a predetermined pressure $P_a$ and temperature.

Figure 3C:
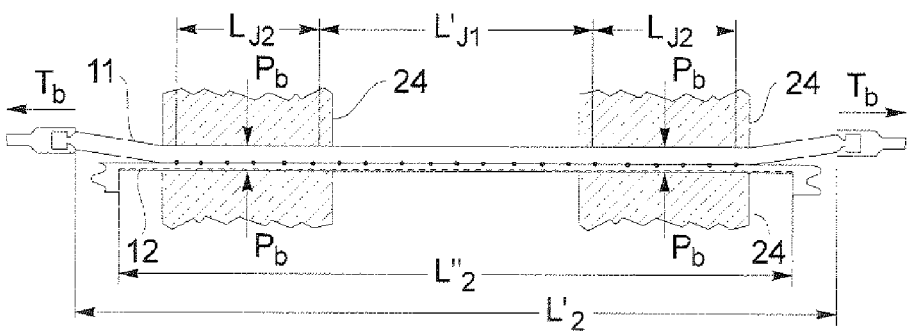

FIG. 3C depicts the second step of manufacturing of the tubular belt. Forces $T_b<T_a$ are applied to anchors 20. As a result, the width $L'_2<L'_1$. The press-forms 23 release the central portion of the belt, the fused width $L_{J1}$ is shortened to the width $L'_{J1}<L_{J1}$, and the reference width $L''_0$ of the outer layer 12 is shortened to $L''_2<L''_0$. The middle portions of the layers 11 and 12—the joint widths $L_{J2}$—are covered with glue or primer/activator or both and press-forms 24 are applied producing fusion of layers 11 and 12 with help of predetermined pressure $P_b$ and temperature.

Figure 3D:
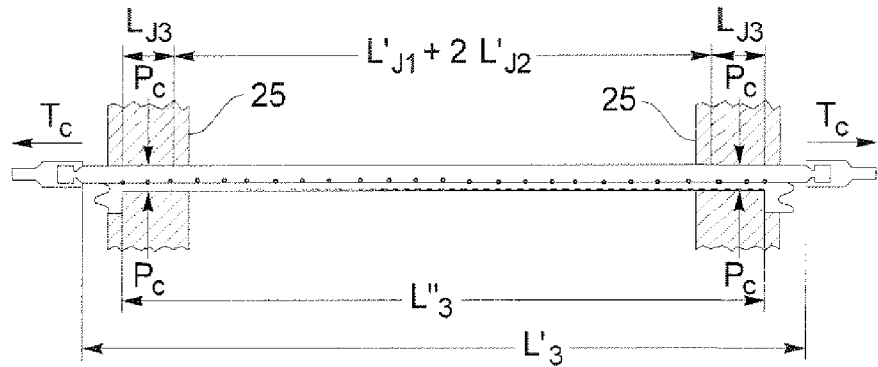

FIG. 3D demonstrates the third step of fabrication of the tubular belt. Forces $T_c<T_b$ are applied to anchors 20. As a result, the width $L'_3<L'_2$. The press-forms 24 release the middle portion of the belt, the fused width $L'_{J1}+2\,L_{J2}$ is shortened to the width $L'_{J1}+2\,L'_{J2}<L'_{J1}+2\,L_{J2}$, and the reference width $L''_2$ of the outer layer 12 is shortened to $L''_3<L''_2$. The outer portions of the layers 11 and 12—the joint widths $L_{J3}$—are covered with glue or primer/activator or both and press-forms 25 are applied producing fusion of layers 11 and 12 with help of predetermined pressure $P_c$ and temperature.

Figure 3E:
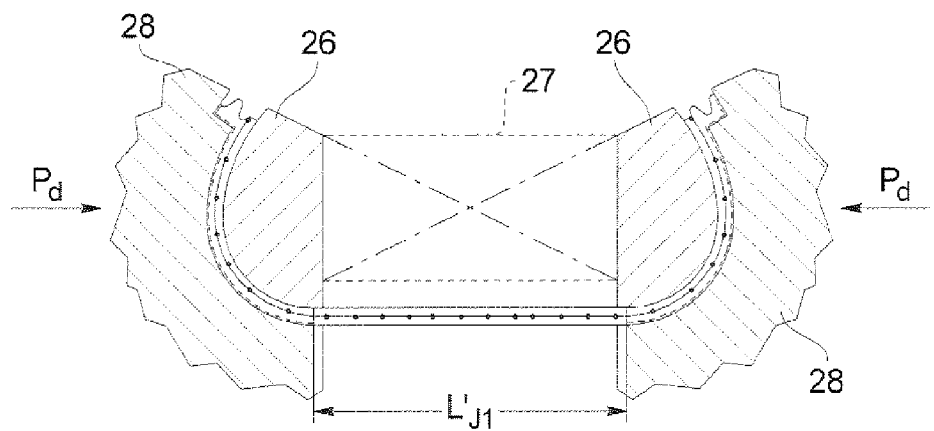
FIG. 3E is a cross-section view showing a process for producing a prestressed tubular belt with two stages of production, with the last stage shaping the designed configuration of the portion of the belt without prestressing.

FIGS. 3A, 3B, and 3E depict the principal method of making prestressed tubular belt in two steps.

FIG. 3E shows the second step of fabrication of the tubular belt. Anchors 20 are released after first step and forces $T_a$ are no longer active. The fused width $L_{J1}$ is shortened to the width $L'_{J1}<L_{J1}$ and the reference width $L''_0$ of the outer layer 12 is shortened as well. The outer portions of the layers 11 and 12 are covered with glue or primer/activator or both and located along the outer surface of the molds 26. That surface corresponds to the required design shape of the final product. Molds 26 are positioned in space with help of support/bracing construction 27. The press-forms 28 having the inner surface matching the outer surface of molds 26 are producing fusion of layers 11 and 12 with help of predetermined pressure $P_d$ and temperature. The shape of molds 26 and press-forms 28 is designed with consideration of the final distribution of outer and inner forces and stresses in any section due to actions of final vertical and horizontal forces as indicated in detailing of FIG. 2.

FIGS. 4A through 8 present other embodiments of the tubular belt with stepwise and variable prestressing along the width of the belt and the principal method of making prestressed tubular in one step.

Figure 4A:
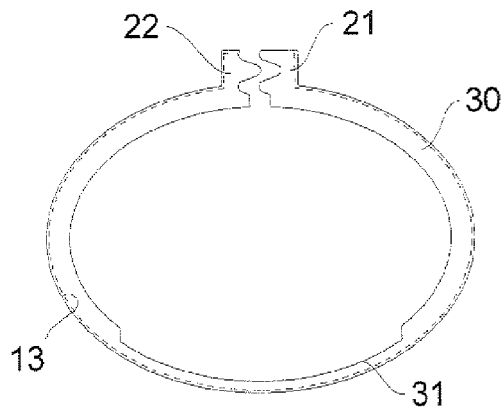
FIGS. 4A-C & 5 are cross-section views depicting an initial shape of four possible versions of the outer (non-prestressed) layer of the belt.

FIG. 4A shows an initial nonstressed mold of a tubular belt 30 having longitudinal edges 21 and 22 (in free open mode), cord layer 13, and depression inner zone 31 in the central portion of the mold. The width and depth of the zone 31 are determined by the same method as described for the first step of prestressing shown in FIG. 3B and correspond to dimensions of the prestressed inner layer 11.

Figure 5:
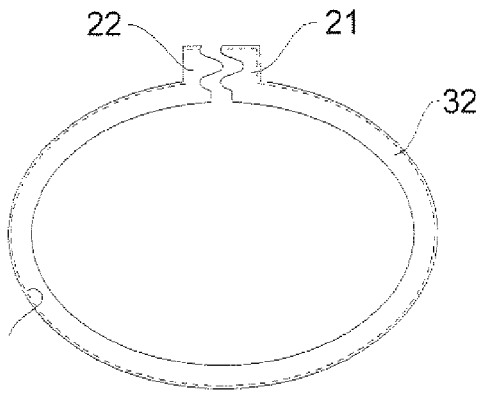

FIG. 5 displays an initial nonstressed mold of a tubular belt 32 having longitudinal edges 21 and 22 (in free open mode), cord layer 13, and thickness corresponding to sum of the thickness of the inner layer 11 and outer layer 12 as shown in FIG. 1.

Figure 4B:
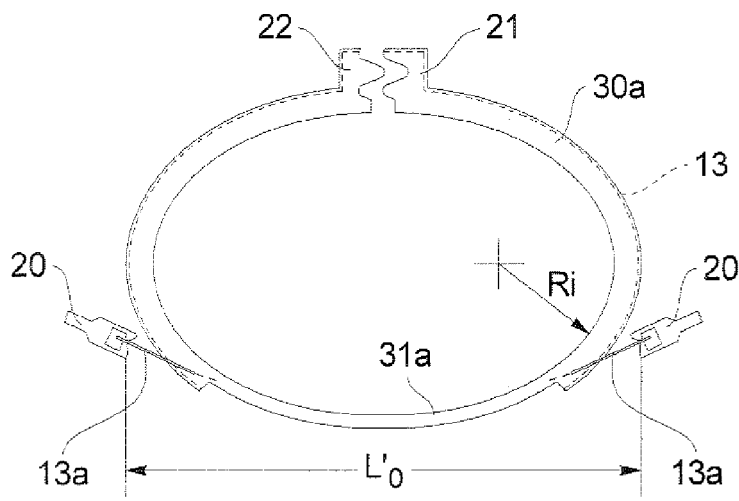

FIG. 4B depicts an initial nonstressed mold of a tubular belt 30a having longitudinal edges 21 and 22 (in free open mode), cord layer 13, and outer depression zone 31a in the central portion of the mold. Mold 30a has cord strip outlets 13a on both sides of the outer depression zone 31a and the anchor devices 20 connected to the cord strip outlets 13a. The inner portion of the cord strip 13a may be implanted inside of the mold 30a separately of the outer cord 13 and be considered as an independent resisting element. The width and depth of the zone 31a are determined by the same method as described for the first step of prestressing shown in FIG. 3B. However, in this embodiment, the prestressed element of the belt is the portion 31a of the mold 30a, and the infill for the depression outer zone is nonprestressed portion 11a, which is designed and corresponds to the dimensions of the prestressed inner layer 11 (31a).

Figure 4C:
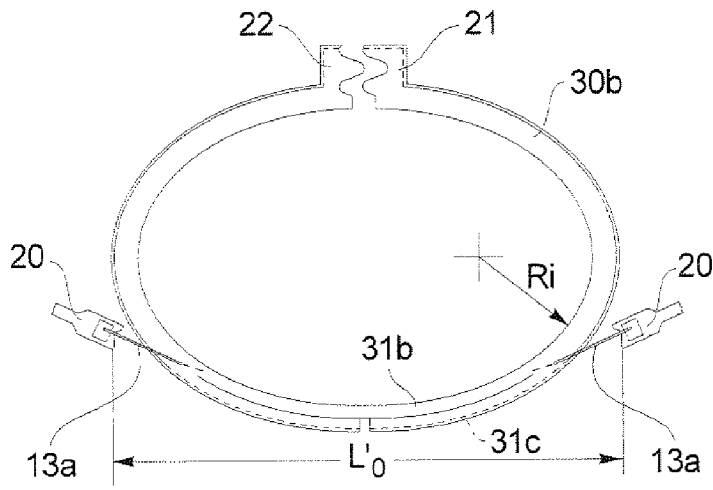

FIG. 4C depicts an initial nonstressed mold of tubular belt 30b having longitudinal edges 21 and 22 (in free open mode), cord layer 13, and split zone 31b/31c in the central portion of the mold. Mold 30b has cord strip outlets 13a on both sides of the split zone 31b/31c and the anchor devices 20 connected to the cord strip outlets 13a. The inner portion of the cord strip 13a may be implanted inside of the mold 30b separately of outer cord 13 and be considered as independent resisting element. The width and thickness of the zone 31b/31c are determined by the same method as described for the first step of prestressing shown in FIG. 3B. However, in this embodiment, the prestressed element of the belt is the portion 31b of the mold 30b, and the compressed component for generation of the inner bending moment are the nonprestressed split portion 31c and additional complement 11c; stretched element 31b and its counterpart—compressed element 31c+11c are designed and correspond to dimensions of the prestressed inner layer 11 (31b).

Figure 6A:
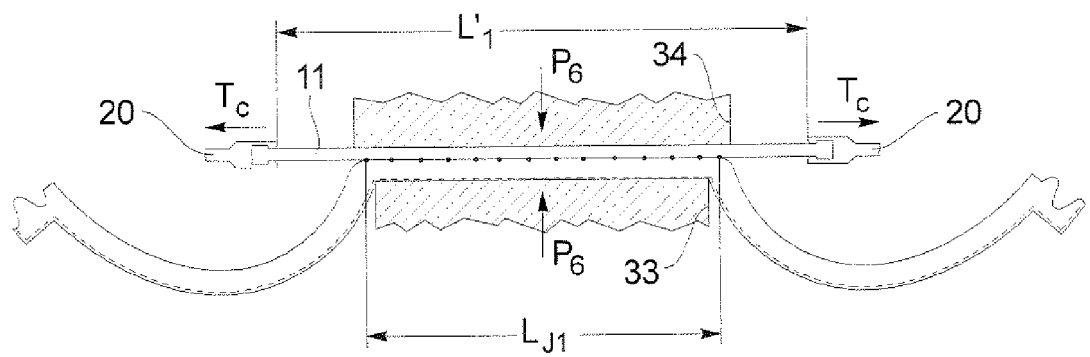
FIGS. 6A-C are cross-section views showing the process for producing a prestressed tubular belt with a single stage production.

FIG. 6A depicts the single step production of the tubular belt for embodiments shown in FIGS. 4A and 5. The inner layer 11 is stretched to the width $L'_1$ between anchors 20 due to force $T_6$, which is applied to anchors 20. The central portion of the layer 11 and the depression zone 31 of the mold 30 (or the central zone of the mold 32)—the joint width $L_{J1}$—is covered with glue or primer/activator or both and press-forms 33 and 34 produce the fusion of layers 11 and 31 (32) with help of predetermined pressure $P_6$ and temperature.

Figure 6B:
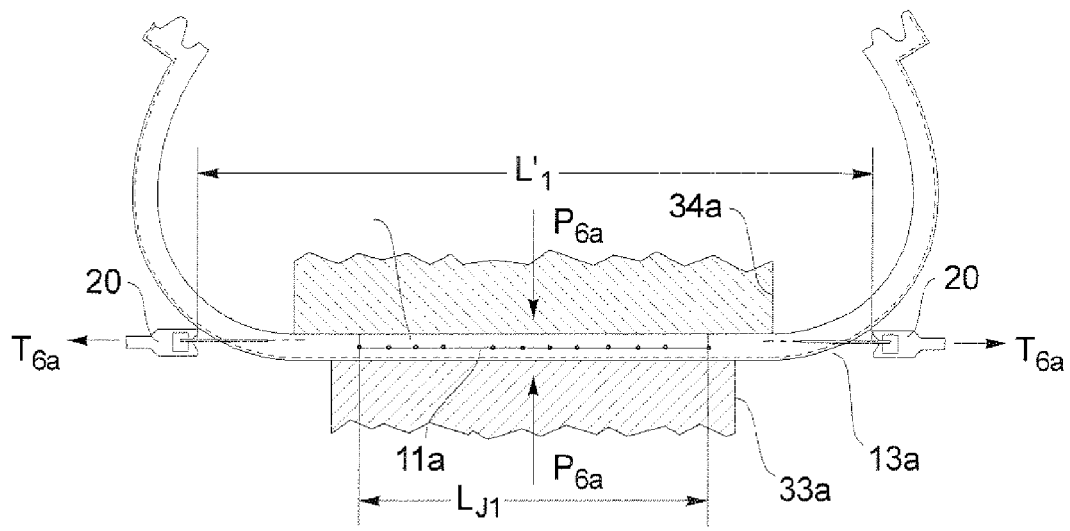

FIG. 6B depicts the single step production of the tubular belt for embodiments shown in FIG. 4B. The depressed portion 31a of the mold 30a is stretched to the width $L'_1$ between anchors 20 due to force $T_{6a}$, which is applied to anchors 20. The depression zone 31a of the mold 30a—the joint width $L_{J1}$—is covered with glue or primer/activator or both and press-forms 33a and 34a produce the fusion of layers 31a and nonprestressed infill 11a with help of predetermined pressure $P_{6a}$ and temperature.

Figure 6C:
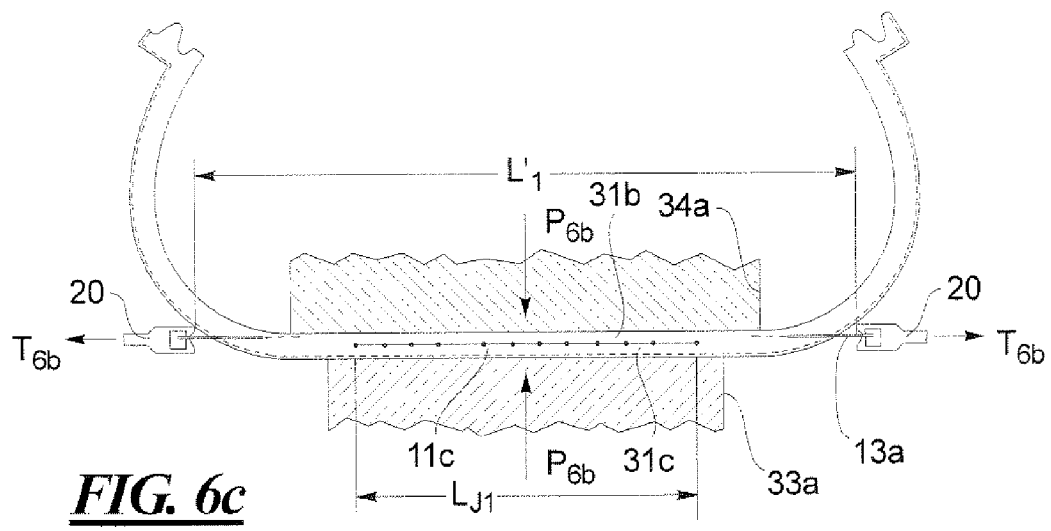

FIG. 6C depicts the single step production of the tubular belt for embodiments shown in FIG. 4C. The stretchable portion 31b of the split zone 31b/31c is stretched to the width $L'_1$ between anchors 20 due to force $T_{6b}$, which is applied to anchors 20. The stretchable portion 31b of the split zone 31b/31c—the joint width $L_{J1}$—is covered with glue or primer/activator or both and press-forms 33a and 34a produce the fusion of the stretchable portion 31b and nonprestressed split portion 31c and complement infill 11c with help of predetermined pressure $P_{6b}$ and temperature.

Figure 7A:
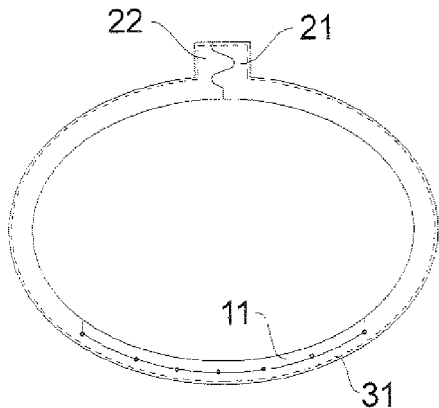
FIGS. 7A-C & 8 are cross-section views showing a final shape of three possible versions of the prestressed tubular belt corresponding to FIGS. 4A-C and 5.
Figure 8:
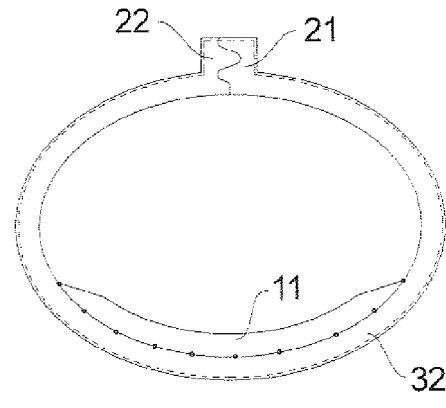

FIG. 7A and FIG. 8 show a final prestressed embodiment of the tubular belt comprising initial molds 31 and 32 and prestressed portion of the inner layer 11. Longitudinal edges 21 and 22 are constantly closed due to predetermined thrust, which is a result of the inner bending moment (interaction between layers 11 and 31 or 32 in the prestressed area $L_{J1}$. The residual portion of the inner layer 11 as shown in FIG. 6A is cut out after a release of anchors 20.

Figure 7B:
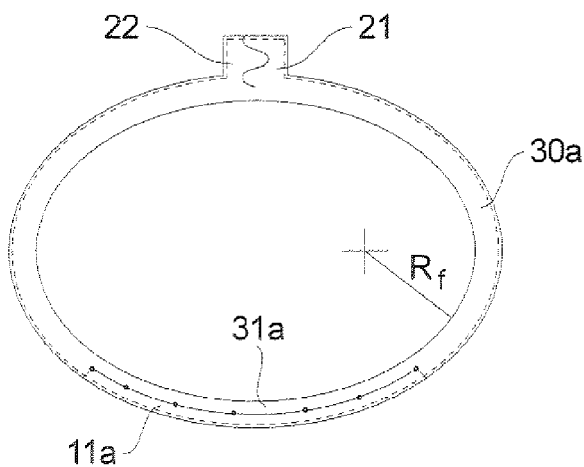

FIG. 7B depicts a final prestressed embodiment of the tubular belt comprising initial molds 30a, a portion of which has prestressed and nonprestressed infill 11a at the outer indentation zone of the mold 30a. Longitudinal edges 21 and 22 are constantly closed due to predetermined thrust, which is a result of the inner bending moment (interaction between layers 11*a* and 31*a* in the prestressed area $L_{n1}$). The residual portion of the outer cord strip 13*a*, as shown in FIG. 6B, is cut out after a release of the anchors 20.

Figure 7C:
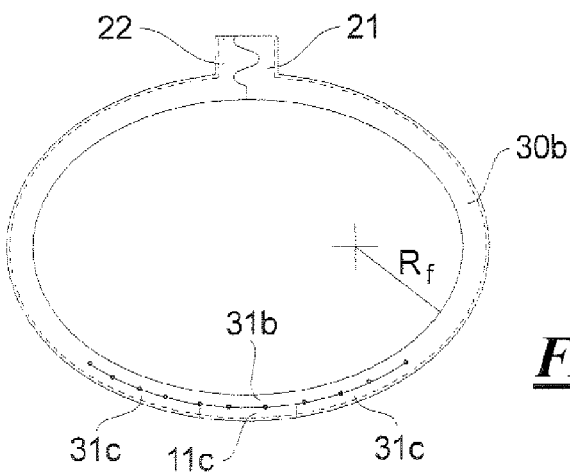

FIG. 7C depicts a final prestressed embodiment of the tubular belt comprising initial molds 30*b* with split zone 31*b*/31*c*, a portion of which has prestressed (31*b*) and non-prestressed components 31*c* and infill 11*c* at the outer zone of the mold 30*b*. Longitudinal edges 21 and 22 are constantly closed due to predetermined thrust, which is a result of the inner bending moment (interaction between layers 31*b* and 31*c*+11*c*) in the prestressed area $L_{n1}$. The residual portion of the outer cord strip 13*a*, as shown in FIG. 6C, is cut out after a release of the anchors 20.

Alternately, although not shown, it may be possible to have the flap structure on the top surface of the belt and provide prestressing by cutting away a portion of a flap and stretching the upper flap portions.

It should be noted that the radii of curvatures of different portions of the initial molded shapes as shown in FIGS. 4A-C and FIG. 5 are designed with consideration of the final distribution of outer and inner forces and stresses in any section due to actions of the final vertical and horizontal forces as indicated in the description of FIG. 2. Thus, initial radius $R_i$ that is shown on FIG. 4B and FIG. 4C is less than final radius $R_f$ of FIG. 7B and FIG. 7C.

FIG. 9 shows an initial arrangement of the preferred embodiment of the single step production of the tubular belt with a multi-step prestressed inner layer 11. The width of the layer 11, as is shown in FIG. 9, corresponds to the initial width of one half of the layer 11 as presented in FIG. 3A (before prestressing). Anchor strips 35 through 38 are attached to the inner surface of the layer 11 with the desired spacing.

Anchor strips 35-38 are made of elastic material and comprise a base 40, sloped web 41 and upper influx 42. The influx 42 has a curved smooth lower surface tangent to lower side of the sloped web 41, a flat upper surface parallel to direction of the sloped web 41, and a step-like jump into the upper surface of the sloped web 41. Base 40 is firmly attached to a predetermined place of the inner layer. The angle between base 40 and the sloped web 41 with the innermost point 43 corresponds to a wedge angle of the rib cast 61 through 64 of a device/tool 50.

FIG. 9 depicts one half of the cross section of the device/tool 50 for multi-step prestressing of the inner layer 11. Device 50 comprises vertical webs 51 through 56, joined together with a stiffener 58 at, e.g., a 12" space. The central web 51 is located at the vertical symmetry line of the device. The bottom of the web 51 and bottom of the next web 52 are connected with a plate 60. The bottom surface of the plate 60 is engineered as an arc of the large radius $R_L$ significantly larger than any radii of the designed tubular belt shape.

The rib cast 61 is located on the other side of the bottom of the web 52. Rib casts 61 through 64 are typical for each of the vertical webs 52 through 55. A typical rib cast has a wedge-like cross section, with an indent 65 on the bottom side of the rib, which corresponds to the section of the bottom 40 of the anchor strips 35 through 38. Another typical detail of the rib casts are apexes 66 through 69. The bottom surfaces of the cast ribs 61 through 64 (including bottom surface of the indents) are made as an arc of the same radius $R_L$ as plate 60. Also, the heights of the webs 52 through 55 vary in such a way that all of the rib casts generate one arc of radius $R_L$. The rib 56 is connected to the arc plate 57, whose radius is equal to the design radius of the future tubular belt in the vicinity of the longitudinal edge ($R_2$ in FIG. 1). A stiffener 59 joins the rib 56 and the plate 57 and is located in the same space as the stiffener 58.

FIG. 10 shows the first stretch of the inner layer 11 with the help of a guided grip 70. The inner layer 11 is stretched until the influx 42 of the anchor strip 35 is located between an apex 66 and the rounded heel of the rib 53. One can presume that this stretching will be the maximal one.

FIG. 11 presents the second stretch (first release) of the inner layer 11. As a result of that release, the influx 42 of the second anchor strip 36 is located between an apex 67 and the rounded heel of the rib 54. The first anchor strip 35 thus finds its final position on the rib cast 61.

FIG. 12 depicts the third stretch (second release) of the inner layer 11. As a result of that release, the anchor strip 37 is in close proximity of apex 68 of the rib cast 63, and the influx 42 of the fourth anchor strip 38 is located between an apex 69 and the rounded heel of the rib 56. The second anchor strip 36 thus finds its final position on the rib cast 62.

Figure 13:
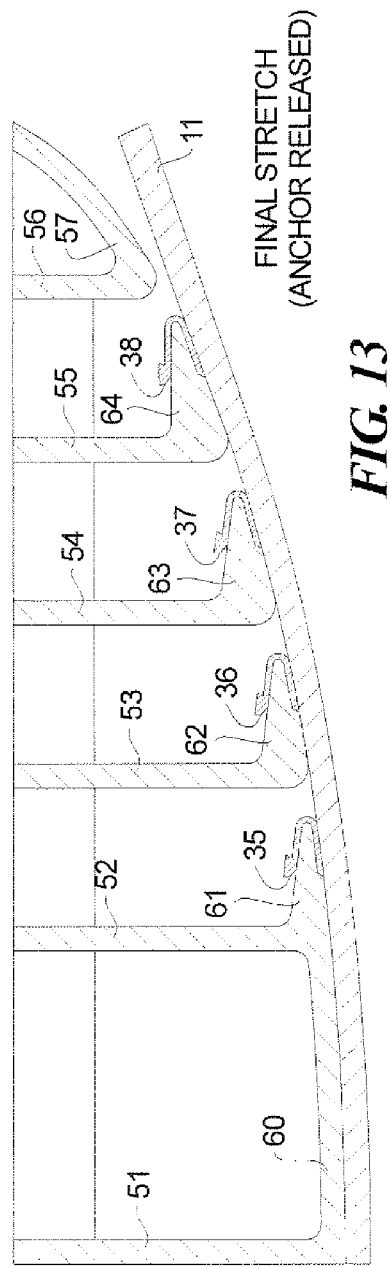
FIG. 13 is a cross-section view showing the finishing stretch of the inner layer. Once the guided grip is released, the end of the inner layer and all attached anchor strips are in their final positions.

FIG. 13 presents the final stretch (complete guided grip release) of the inner layer 11. As a result of that release, all anchor strips 35 through 38 are in their final positions on the rib cast 61 through 64. The rest of inner layer 11 is in its natural, no-stressed state.

Figure 14:
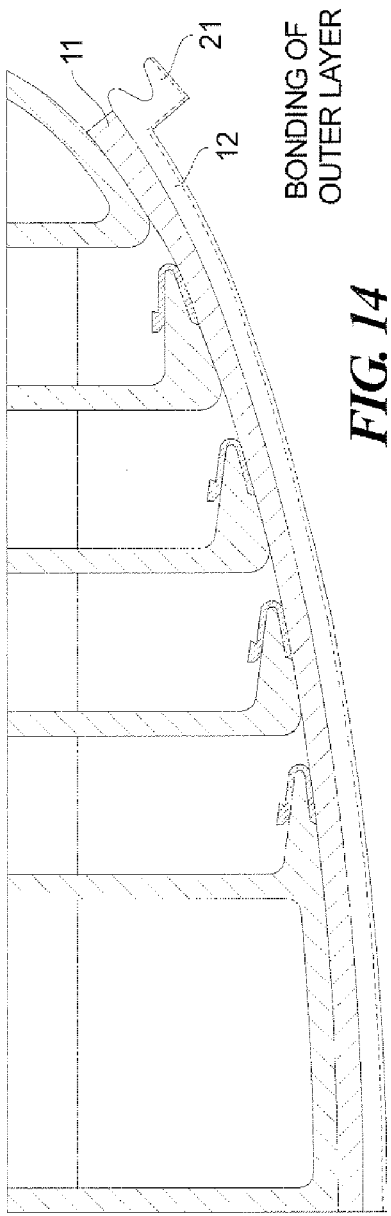
FIG. 14 is a cross-section view showing a final part of a process for making a prestressed tubular belt in a single step utilizing a multi-step prestressing device. The outer layer with longitudinal edges is applied in full length to the multi-step prestressed inner layer. The area of the belt along the longitudinal edges is shaped to the designed configuration without prestressing.

FIG. 14 demonstrates the final stage of the preferred embodiment of the single step production of the tubular belt with a multi-step prestressed inner layer 11. The outer no-stressed layer 12 with longitudinal edge 21 is covered with glue or primer/activator, or both, and installed in the proper position for fusing in a single step with inner layer 11. The supporting press-form, similar to 28 of FIG. 3E is not shown for clarity. In an embodiment of the invention, the anchor strips 35 through 38 are ultimately cut off in the final manufacturing stages, although it is possible that the anchor strips would remain in place.

Figure 15:
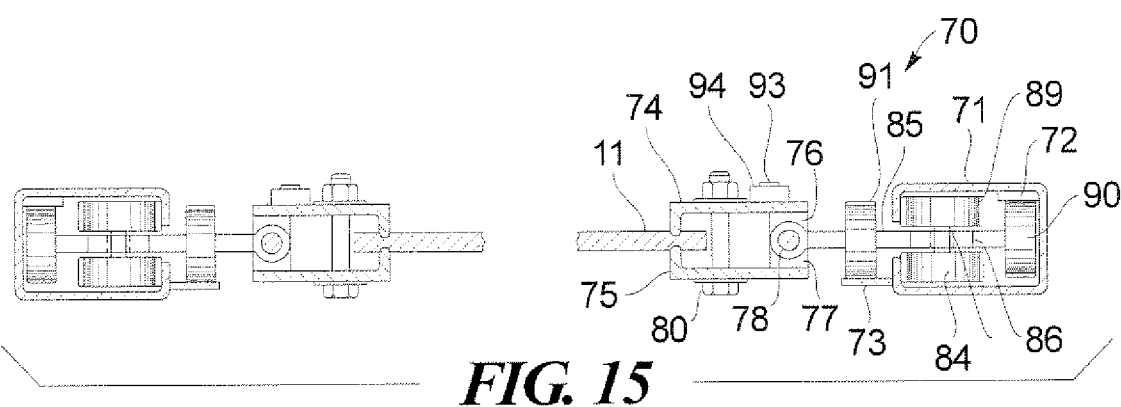
FIG. 15 is a cross-section view showing the guided grip device for stretching the inner layer.
Figure 17:
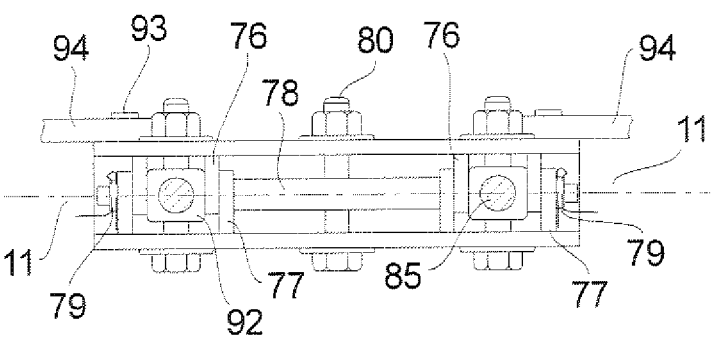
FIG. 17 is a section view along line 1-1 of FIG. 16.

FIGS. 15, 11 and 17 show a cross section, plan and a longitudinal section of the technological suggestion for fulfillment of the preferred embodiment of this invention—a guided grip device 70.

The guided grip device 70 is used to stretch the inner layer(s) 11 of the tubular belt to the design proportions, and to hold it in that stretched (prestressed) position during the technological time of bonding inner and outer layers together into one monolithic entity. The guided grip device 70 incorporates a guide portion and a grip portion. The guide portion of guided grip device 70 comprises a special profile guide 71 with welded strips 72—inside of the profile 71—and strip 72 outside of the profile 71.

The grip portion of the guided grip device comprises the upper jaw 74 and lower jaw 75. The upper jaw 74 has four bearings 76 as shown at Section 1-1, and the lower jaw 75 has four bearings 77. The shaft 78 connects the upper and the lower jaws and all eight bearings 76 and 77 into a rotating mechanism with the center of rotation being in the center line of the shaft 78. The shaft 78 is secured in its proper position with pins 79 on both ends of the shaft 78. The three sets of fasteners 80 comprise a bolt, nut and washers; they tighten jaws 74 and 75; as a result, the edge of the inner layer 11 is firmly gripped between jaws. Upper jaw 74 has two dowels 93; those dowels together with the link plate 94 make a flexible connection (in the plane of the stretched inner layer 11) between guided grip devices 70.

Figure 16:
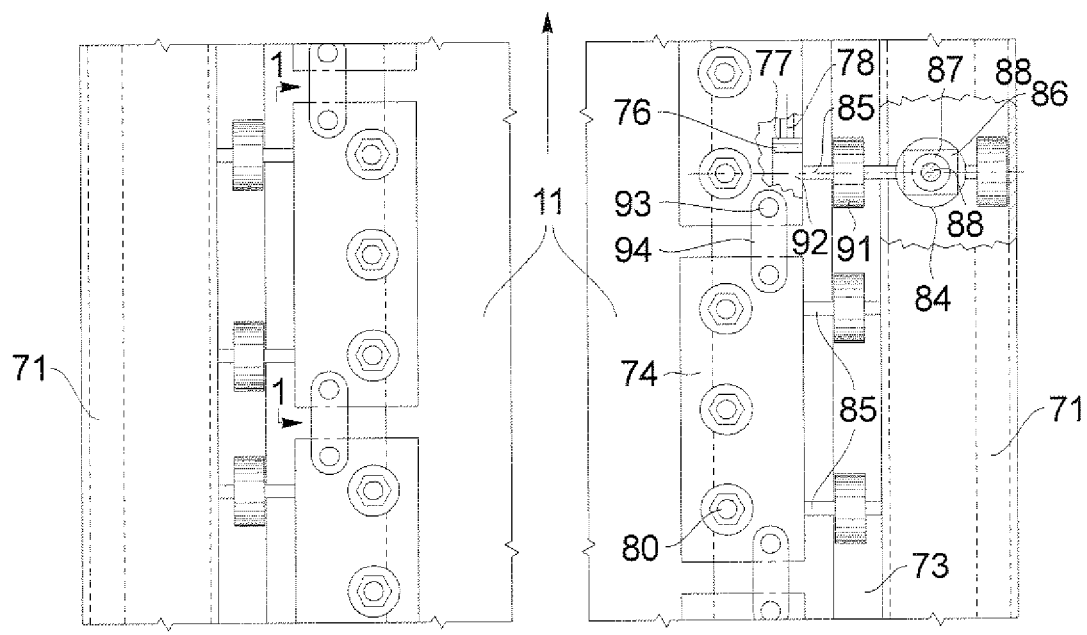
FIG. 16 is a plan view of the guided grip device shown in FIG. 15.

The guided grip device 70 has two shafts 85 connecting the guide portion with its grip counterpart. Each shaft 85 is connected on one side to a bulge bearing 92, which is rotating around a journal of the shaft 78 in the grip portion of the device. Shaft 85 supports two vertical rollers 90 and 91, which secure the position of the shaft 85 and a grip portion of the device in the vertical plane. The shaft 85 has in its middle part a square bearing enlargement 86 that is housing the bearing 87 and the vertical axis 88 which in turn secures two horizontal rollers 84 and 89. Thus, when the whole system of chains of the guided grip devices 70 is pulled together with layer 11 in the direction of movement as designated in FIG. 16, and the distance between guide shapes 71 increases, the grip portion of the device 70 is stretching the layer 11. Each device 70 has stability in the vertical plane and has enough flexibility in a horizontal plane that some stress concentration at the ends of jaws' grip, due to non uniform stretching of the belt 11, does not reach significant values and diminish (by the Sun-Venoun principle) within a distance of two gaps between jaws 74 (75). Guided grip devices 70 are arranged in alternate order as shown in FIG. 16, for maximum uniformity of the tension stresses in the layer 11.

Figure 18:
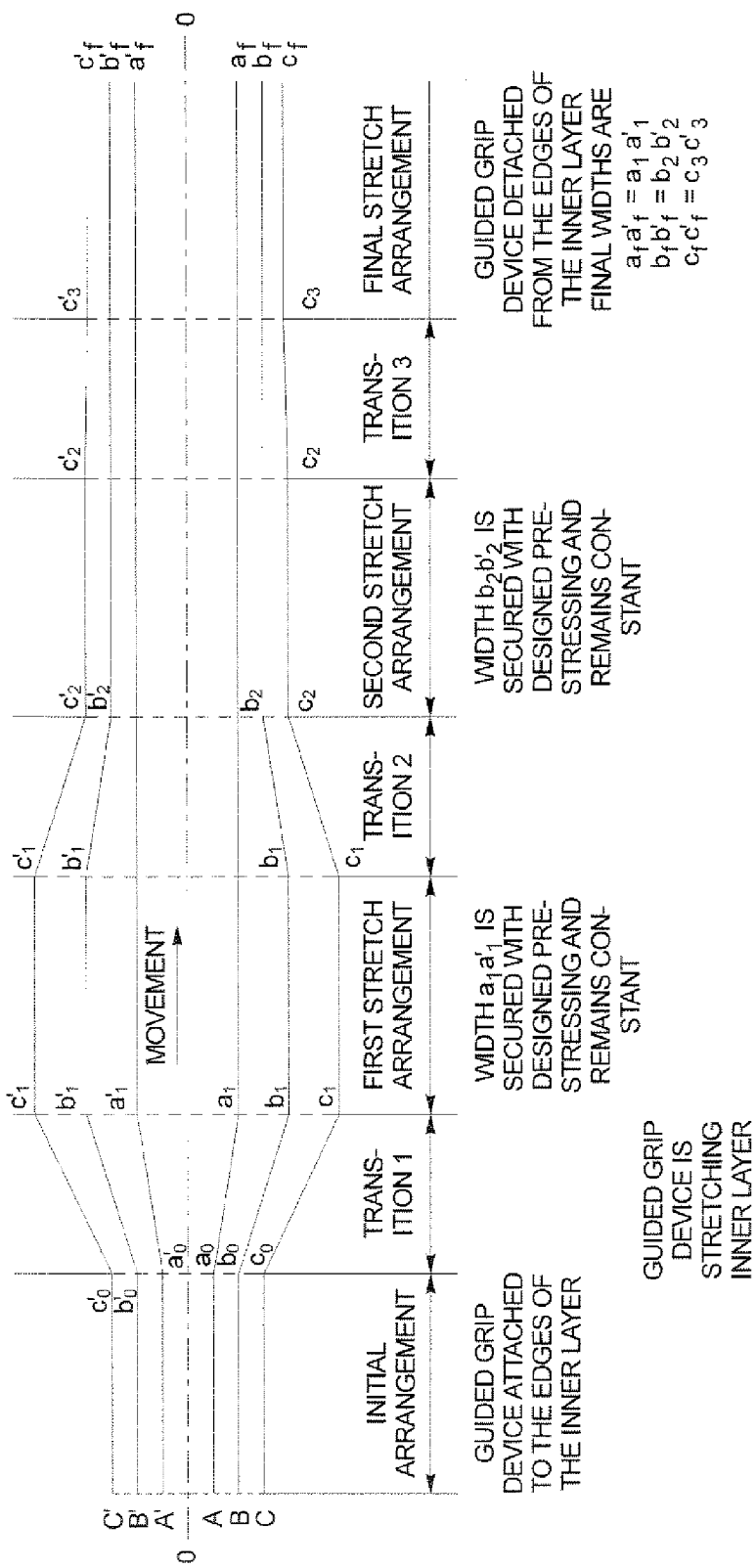
FIG. 18 is a schematic plan view illustrating the generation and constancy of various prestressed zones at various portions of the inner belt width.

FIG. 18 depicts a schematic plan view of the generation and constancy of various prestressed zones at various portions of the inner belt width. Line O—O is the central (symmetry) line of the inner layer 11 along its length. Lines C and C' represent longitudinal edges of the inner layer 11, lines A, A', B, and B' are boundaries of the zones with different prestressing. A portion of the initial arrangement serves as a place where the guided grip device 70 is attached to the longitudinal edges of the inner layer 11. No other forces or stresses are applied to the layer at this portion.

Grip devices 70 together with the attached inner layer 11 are propelled from left to right (in the direction of movement) and, in the portion Transition 1, grip devices 70 are guided apart to reach the degree of maximum design stretch for the central zone A-A' of the inner layer 11. Obviously, all zones of the inner layer 11 have the same degree of stretch or stress throughout the portion of the first stretch arrangement, where the stretch (stress) of zone A-A' is made constant with help of plastic anchor strips 35 (FIG. 10) or any other technique or process.

When the grip devices 70 together with the attached inner layer 11 reach portion Transition 2, the grip devices 70 on the longitudinal edges are guided toward the center. As a result, in the portion of the Second Stretch Arrangement, stretch (stress) in zones A-C and A'-C' reach the design value of zones A-B and A'-B', and the value of stretch (stress) in zone A-A' remains constant. While being propelled through this portion, the stretch (stress) of zones A-B and A'-B' is made constant with the help of plastic anchor strips or any other technique or process. Actions in the portion Transition 3 are similar to those in the portion Transition 2, and stretch (stress) of zones B-C and B'-C' in the region Final Stretch Arrangement reaches its design value of zero after release of grip devices, in this case. However, stretch (stress) of zone A-A' remains the same as it came up to in the First Stretch Arrangement region, and stretch (stress) of zones A-B and A'-B' remains constant after the Second Stretch Arrangement portion.

Thus, the stretch (stress) distribution in the inner layer 11 at the time when fusion with outer layer 12 should take place is as follows: the central zone A-A' has a maximum value of stretch (stress), the neighbor zones have less and less value of stretch (stress), and the zones which include longitudinal edges, should have minimal or zero stretch (stress), no matter what technique or process is used in approaching the fusion stage. The number of zones may vary, however, there is always at least one zone with prestressing in the middle portion of the belt width and zones, which include longitudinal edges, with less, minimal, or no stress.

The process of variable prestressing along the width of the tubular belt can be achieved with the use of a herring-bone like reinforcement made of steel, plastic, or other materials as well.

FIGS. 19 and 20 show a possible use of a flat spring reinforcement mechanism to accomplish the main idea of my invention: to assure variable (stepwise) prestressing of the tubular belt in order to maintain a predesigned shape of the belt's cross-section, and to secure a predetermined value of thrust between longitudinal edges of the tubular conveyor belt. There is an array of flat spring elements $s_1$ through $s_4$ joined into a herring bone structure with the help of distribution rods "a" through "e"; the rods a-e are connected to the spring elements $s_1$-$s_4$ at their ends and middle points as shown in FIG. 20. An arrangement of connection points of spring elements to the distribution rods may be based upon the technological process to be used for belt production. Parameters of the spring array: number, lengths, radii of initial curve(s), etc., should be set up using the design procedure as described herein.

FIGS. 21 and 22 illustrate an embodiment that is operatively similar to the embodiment shown in FIGS. 19 and 20, in that the variable stress is induced across the width of the belt by the structure s of material. However, according to this embodiment, a single element is used that is made from an elastic material and that may have holes f cut (to reduce the amount of material required and minimize the weight and mass of the structure s) to achieve the variable stress.

FIG. 23 illustrates the spring and rod configuration described by FIGS. 19 and 20 as incorporated into the tubular belt. A similar configuration is used to incorporate the configuration shown by FIGS. 21 and 22 into the tubular belt as well.

It is important to realize that any structure or configuration of material is contemplated by the invention, provided it involves the principle of having an actively prestressed portion of the belt operating in conjunction with a resistive portion of the belt in a variable force manner to achieve the desired belt shape.

Prestressing can be achieved not necessarily with direct linear stretching of the part of the semi product as it is shown in FIG. 3 through FIG. 8.

As an example, such prestressing can be accomplished with a way shown in FIG. 24 through FIG. 28, as illustrated by the use of mandrels. The general use of mandrels is known in the hose production industry—however, it is not known to use mandrels to form the variable prestressed and resistive elements of a tubular belt having a longitudinal slit according to the present invention.

In general, according to this embodiment, a partial product is made on the small diameter mandrel having a helicoidal rib. Then, after vulcanizing, the vulcanized hose (the finished partial product) from the small mandrel is transferred onto a larger mandrel in order to achieve prestressing and become an active prestressing element by winding onto the large mandrel.

Figure 30:
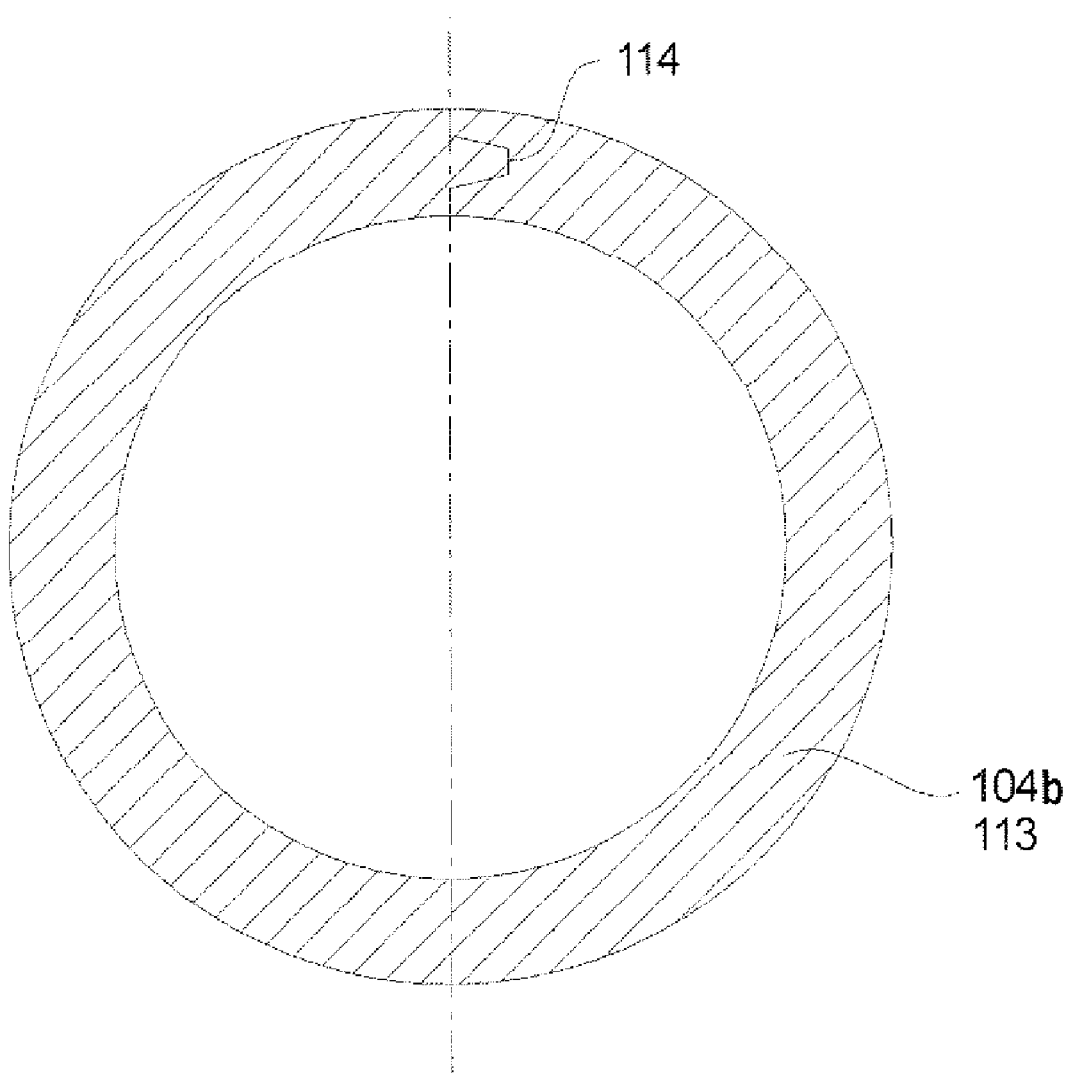
FIG. 30 is a cross section view of the round shape tubular belt resulting from the use of mandrels of FIG. 26.

Then, a new layer of raw material is applied on the prestressed layer of the finished partial product and the vulcanization process is repeated. Some resisting element is used to achieve variable or stepwise prestressing. In this case, special shape fillers are installed during a first step and a second step bringing variable prestressing on the large mandrel. All gaps are then filled with a raw material, forming the resisting element, and a further vulcanization/bonding process secures the final product—a tubular belt with variable prestressing, when the new "hose"/"tube" is cut along the neck line and a tongue-and-groove are made on the butt contact surface of longitudinal edges, as shown on FIG. 30.

Figure 24:
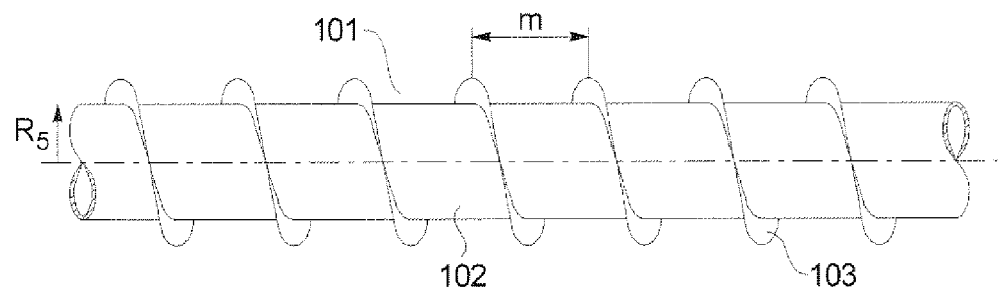
FIG. 24 is an elevation view of a simplified auger mandrel used for creating a vulcanized spiral spring-like product.
Figure 25:
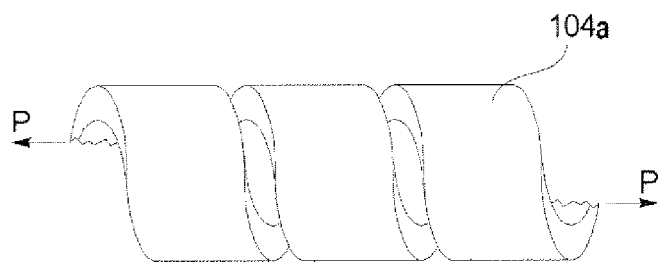
FIG. 25 is an elevation view showing a vulcanized spiral spring-like product resulting from the use of the auger mandrel of FIG. 24.

FIGS. 24 and 25 show a simplified version of a mandrel implementation that is used solely for illustrative purposes here.

FIG. 24 shows auger-like mandrel 101 comprising central pipe 102 with outer radius $R_5$ and spiral rib 103 having pitch "m". When a plastic material, i.e., raw natural rubber, is wound up on the mandrel 101 on the surface of the pipe 102 with a thickness not more than the height of the spiral rib 103. It then goes through the vulcanization process, say in the autoclave, and, after curing, is taken off the mandrel, when it will then have a shape of the flat spiral rubber spring 104a with some gaps between its twists, which correlate to the tension force "P" applied as shown in FIG. 25. The inner radius of the rubber spring 104a is equal to the outer radius $R_5$ of the central pipe 102. The spring 104 as shown in these figures would have a rectangular shape if uncoiled (i.e., straight edges).

Figure 26:
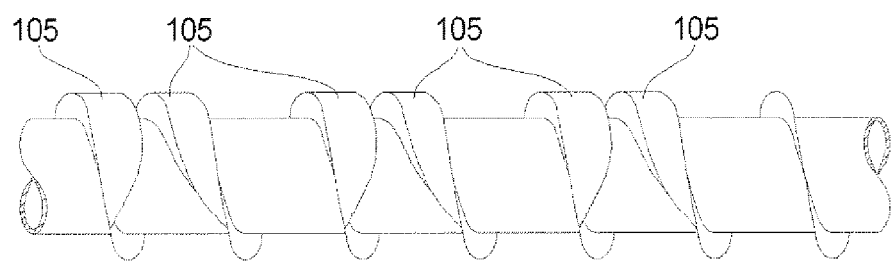
FIG. 26 is an elevation view showing special fillers installed on the auger mandrel of FIG. 24 used by a method according to an embodiment of the invention.

The embodiment shown in FIG. 26, differs from this simplified version in that fillers 105 are provided which ultimately produce a spring 104b having curved edges.

Such fillers 105 may be installed adjacent to the spiral rib 103 at equal intervals, e.g., every 720° down the spiral (around the mandrel 101), as it is shown in FIG. 26. Additional material is then added into the gap region remaining on the mandrel similar to the manner described with the simplified construction, which ultimately becomes a part of the spring 104b. The material is then cured, e.g., in an autoclave.

Figure 27:
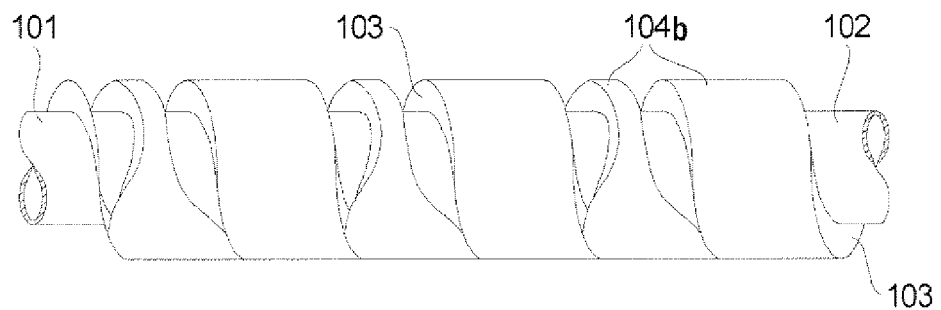
FIG. 27 is an elevation view showing the first stage product resulting the use of the auger mandrel of FIG. 26.

The shape of the rubber spring 104b after winding at the open space of the auger mandrel 101 and after curing is depicted in FIG. 27 (fillers 105 are not shown for clarity—if the fillers 105 were present, the outer surface of FIG. 27 would reflect a relatively smooth cylindrical surface). As can be seen in FIG. 27, the spring 104b has a spiral shape that repeats every 720° down the mandrel 101.

Figure 28:
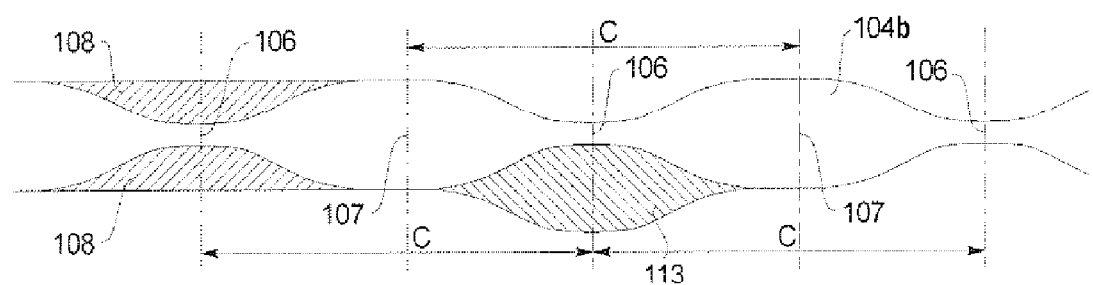
FIG. 28 is a plan view of a flattened first stage product resulting the use of the auger mandrel of FIG. 26.

The flattened shape of the rubber spring 104b after unwinding from the auger mandrel 101 (FIG. 27) is shown in FIG. 28. This shape differs from the uncoiled shape that would be produced by hypothetical spring 104a in that the belt 104b varies in width as one travels down a longitudinal axis of the belt 104b. The shape is of variable width and has equal spaces "C" between the places with the most narrow width—necks 106; obviously, the same distance "C" is accounted for between the centers of the widest places 107. It should be noted that the maximum width 107 of the rubber spring 104b is less than pitch "m" of the initial mandrel 101 on the thickness of the spiral rib 103. The flat shape of the fillers 105 is shown in FIG. 28 as shaded areas 108.

Figure 29:
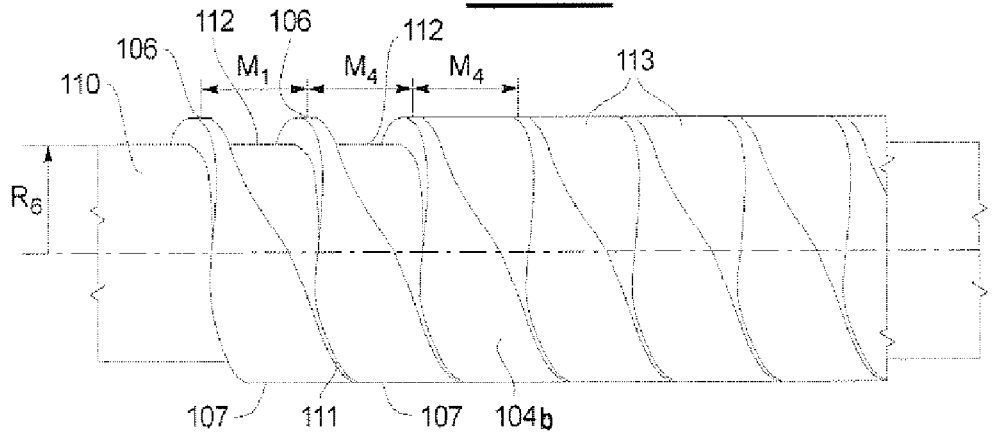
FIG. 29 is an elevation view showing a second stage of the process of making a tubular belt on mandrel using a first stage product made on the auger mandrel of FIG. 26.

One can select a regular mandrel 110 (FIG. 29) with radius $R_6 > R_5$, and approximately $R_6 = $ "C"/$(2\pi)$. Then, when rubber spring 104b of FIG. 28 is wound on the mandrel 110 with pitch "m", all of the widest sections 107 of the rubber spring 104b of FIG. 28 appear on one end of the mandrel diameter, and all necks 106 appear on the other end of the same diameter, as shown in FIG. 29. In other words, the pattern on this larger mandrel repeats every 360° (instead of 720°) on the new mandrel. Three turns of the rubber spring 104b on the left side of the mandrel 110 depict a constant gap 111 between portions of maximum width (equal to the thickness of the spiral rib 103) and variable, figured shape gaps 112 between the other part of the rubber spring 104b.

The gaps 112 are filled with raw rubber or with other material 113, which, after processing, will join monolithically all turns of the rubber spring 104b into one tubular shape, as shown on the right portion of FIG. 29. Following equation (1), it can be derived that the elastic rubber spring 104b, which was made with radius $R_5$ and then wound up with radius $R_6$, possessed, after manufacturing on mandrel 110, the inner bending moment $$M_1 = EI(R_6 - R_5)/R_5 R_6 \qquad (5)$$

The inner bending moment is proportional to the difference between initial and final radii and to the moment of inertia of the bent section. Clearly, in order to decrease the bending moment in a direction from the center of the open belt toward its longitudinal edges, the moment of inertia of the acting bent section should be reduced. This is why the fillers 105 in FIG. 26 are installed. The presence of the fillers 113 in FIG. 29 also contribute to diminish the inner bending moment effect in the zone close to longitudinal edges of the tubular belt. One can call a wound rubber spring 104b (and even its neck 106) as the active bending elements, and fillers 113 as the resisting elements. The combination of active and resistant elements secure a proper distribution of the inner bending moment across the width of the tubular belt for achieving a designed cross-sectional shape and thrust between closed edges.

In this case, a spiral-like partial product of an elastic material, i.e., rubber, is produced on the auger mandrel having a small size (diameter). The auger mandrel has special shape fillers arranged on the calculated intervals along the helical line in such a way that that the molded product, being unwound, has a particular shape, e.g., an area 113 similar to that shown in FIG. 28.

When this partial product is wound around a larger mandrel, it possesses a prestressing "memory". The size (diameter) of the larger mandrel and intervals of the "necks" between fillers are in certain proportions. For example, a diameter of the large mandrel may be "π" times less than intervals of the narrowest distances between fillers on the small auger mandrel. This secures the appearance of the "necks" of the partial product on the same generation line of the large mandrel after winding if the maximum wide zones of the partial product are contacting each other while wound.

Gaps between wound partial product are filled with raw material, and the outer layer and plies are applied. After fusion, the second step partial product is cut along the "neck" line, and edges details with an interlocking shape are applied to the sides. The main idea of the described version of technology and a version of the product is that it does not matter how the prestressing effect is generated; it is important however to secure variable or stepwise prestressing forces and variable or stepwise breaking forces; more over, the maximum breaking forces should be located along the edges of the tubular belt and the maximum active forces should be located in the central portion of the tubular belt.

For the purposes of promoting an understanding of the principles of my invention, reference has been made to the preferred embodiments illustrated in the drawings, and specific language has been used to describe these embodiments. However, no limitation of the scope of my invention is intended by this specific language, and my invention should be construed to encompass all embodiments that would normally occur to one of ordinary skill in the art. The present invention may be described in terms of functional block components and various processing steps. Such functional blocks may be realized by any number of components configured to perform the specified functions. For example, the present invention may employ various processing elements which may carry out a variety of functions. Furthermore, the present invention could employ any number of conventional techniques for processing and the like.

The particular implementations shown and described herein are illustrative examples of my invention and are not intended to otherwise limit the scope of my invention in any way. For the sake of brevity, conventional elements and functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of my invention unless the element is specifically described as "essential" or "critical". Numerous modifications and adaptations will be readily apparent to those skilled in this art without departing from the spirit and scope of the present invention.

What is claimed is:

1. A method for manufacturing a self-closing tubular belt with predetermined compression forces at a longitudinal joint, comprising:

provinding a cylindrical small mandrel having a spiral rib, spirals of the spiral rib having spacers;

winding a plastic material onto the small mandrel having a spiral rib, such that the plastic material thickness is not more than the height of the spiral rib;

curing the plastic material;

removing the plastic material from the small mandrel, resulting in the plastic material being in a form of a spiral rubber spring having gaps between its twists;

winding the rubber spring on a larger mandrel such that widest sections of the spring are associated with one end of the mandrel diameter, and narrowest sections of the spring are associated with an opposite end of the mandrel diameter, thereby forming winding gaps;

filling the winding gaps with a raw filler material;

processing the rubber spring and the raw material so that all turns of the rubber spring are joined together monolithically; and removing the processed rubber spring with filler from the mandrel by making a longitudinal split in the spring, thereby producing the tubular belt having prestressed regions formed by the spring, and resisting portions formed by the filler material.

2. The method according to claim 1, wherein the spacers are applied to the rib at intervals of more than 360°.

* * * * *